(12) United States Patent
Bohlen

(10) Patent No.: US 7,857,884 B2
(45) Date of Patent: Dec. 28, 2010

(54) AIR CLEANER INCLUDING AN IMPROVED AIRFLOW PATH

(75) Inventor: John R. Bohlen, Long Beach, MS (US)

(73) Assignee: Oreck Holdings, LLC, Cheyenne, WY (US)

( * ) Notice: Subject to any disclaimer, the term of this patent is extended or adjusted under 35 U.S.C. 154(b) by 0 days.

(21) Appl. No.: 11/479,072

(22) Filed: Jun. 30, 2006

(65) Prior Publication Data

US 2008/0000205 A1    Jan. 3, 2008

(51) Int. Cl.
*B01D 50/00*    (2006.01)
(52) U.S. Cl. .......................... 55/471; 29/889; 55/DIG. 5
(58) Field of Classification Search .................. 55/308, 55/471, 472, 482, 473, 467, DIG. 5; 96/380, 96/384, 388; 29/889
See application file for complete search history.

(56) References Cited

U.S. PATENT DOCUMENTS

| | | | |
|---|---|---|---|
| 2,061,535 A * | 11/1936 | Davies | 454/206 |
| 3,795,092 A * | 3/1974 | Schwartz et al. | 55/473 |
| 3,925,043 A * | 12/1975 | Matrone et al. | 96/136 |
| 3,988,131 A | 10/1976 | Kanazawa et al. | |
| 4,227,446 A | 10/1980 | Sone et al. | |
| 4,317,661 A * | 3/1982 | Sasaoka et al. | 96/67 |
| 4,376,642 A | 3/1983 | Verity | |
| 5,034,032 A | 7/1991 | Yikai et al. | |
| 5,268,009 A | 12/1993 | Thompson et al. | |
| 5,388,426 A * | 2/1995 | Wada et al. | 62/263 |
| 5,600,963 A * | 2/1997 | Koo et al. | 62/262 |
| 6,036,757 A * | 3/2000 | Gatchell et al. | 96/424 |
| 6,155,068 A * | 12/2000 | Hironaka | 62/303 |
| 6,164,082 A * | 12/2000 | Okamoto et al. | 62/317 |
| 6,178,765 B1 * | 1/2001 | Hironaka et al. | 62/303 |
| 6,314,748 B1 * | 11/2001 | Zhu et al. | 62/263 |
| 6,338,382 B1 * | 1/2002 | Takahashi et al. | 165/96 |
| 6,361,590 B1 * | 3/2002 | Gilbert et al. | 96/384 |
| 6,363,734 B1 * | 4/2002 | Aoyagi | 62/264 |
| 6,680,028 B1 * | 1/2004 | Harris | 422/122 |
| 6,722,152 B1 | 4/2004 | Hille et al. | |
| 6,725,684 B2 * | 4/2004 | Lee et al. | 62/298 |
| 6,729,154 B2 * | 5/2004 | Takashima et al. | 62/317 |
| 6,782,707 B2 * | 8/2004 | Shindo et al. | 62/264 |
| 6,892,551 B2 * | 5/2005 | Gunji et al. | 62/262 |

(Continued)

FOREIGN PATENT DOCUMENTS

GB        2412727 A        10/2005

*Primary Examiner*—Duane Smith
*Assistant Examiner*—Sonji Turner
(74) *Attorney, Agent, or Firm*—Winston & Strawn LLP

(57) ABSTRACT

An air cleaner including an improved airflow path is provided according to the invention. The air cleaner includes a duct extending between an air inlet of the air cleaner and an air outlet, with the duct being configured to conduct an airflow. The duct includes a shaped input region located downstream of one or more air cleaning components and upstream of an impeller, a curved transition region downstream of the shaped input region, with the curved transition region transitioning the airflow from an air inlet orientation to an air outlet orientation, and an expansion output region downstream of the curved transition region, with the expansion output region allowing the airflow to expand. The air cleaner further includes the impeller located in the curved transition region of the air duct. The airflow is smoothly conducted from the air inlet to the air outlet by the duct.

31 Claims, 2 Drawing Sheets

U.S. PATENT DOCUMENTS

| | | | |
|---|---|---|---|
| 6,926,762 B2 * | 8/2005 | Kim et al. | 96/397 |
| 6,929,684 B2 * | 8/2005 | Chang et al. | 96/226 |
| 7,201,787 B2 * | 4/2007 | Choi et al. | 55/471 |
| 2005/0284168 A1 * | 12/2005 | Lee et al. | 62/317 |
| 2005/0287051 A1 | 12/2005 | Yuen | |
| 2006/0032198 A1 * | 2/2006 | Cha et al. | 55/418 |
| 2006/0053758 A1 * | 3/2006 | Wu et al. | 55/471 |
| 2006/0177356 A1 * | 8/2006 | Miller | 422/121 |

* cited by examiner

SECTION AA

AIR CLEANER INCLUDING AN IMPROVED AIRFLOW PATH

TECHNICAL FIELD

The present invention relates to an air cleaner, and more particularly, to an air cleaner including an improved airflow path.

BACKGROUND OF THE INVENTION

Air cleaners are widely used in home and office settings for cleaning the air. An air cleaner can filter the air in order to remove airborne contaminants. An air cleaner can therefore include any type of mechanical filter element comprising a mesh, a weave, a foam, etc. An air cleaner can include an odor absorber element that removes odor-causing particles from the air stream. An air cleaner can further include electrical air cleaning components, such as a collector cell that removes dirt and debris from the airflow of the air cleaner and can include an ionizer.

An air cleaner also includes some manner of air moving device that creates an airflow through the filter element and/or electrical air cleaning components. The air moving device can include one or more speed settings that allow the user to control the level of operation of the air cleaner and the resulting volume and speed of the airflow. The user can manipulate controls provided through a control panel in order to select from available operating features or settings.

In use, a motor converts electrical power into rotation of an impeller. The impeller creates an airflow. It is highly desirable that the electrical power is efficiently transformed into airflow. In addition, it is highly desirable that the airflow is created without undue turbulence and noise. Turbulence and noise decrease efficiency of the air cleaner and increase user dissatisfaction.

SUMMARY OF THE INVENTION

An air cleaner including an improved airflow path is provided according to the invention. The air cleaner comprises a duct extending between an air inlet of the air cleaner and an air outlet, with the duct being configured to conduct an airflow. The duct comprises a shaped input region located downstream of one or more air cleaning components and upstream of an impeller, a curved transition region downstream of the shaped input region, with the curved transition region transitioning the airflow from an air inlet orientation to an air outlet orientation, and an expansion output region downstream of the curved transition region, with the expansion output region allowing the airflow to expand. The air cleaner further comprises the impeller located in the curved transition region of the air duct. The airflow is smoothly conducted from the air inlet to the air outlet by the duct.

An air cleaner including an improved airflow path is provided according to the invention. The air cleaner comprises a duct extending between an air inlet of the air cleaner and an air outlet, with the air outlet being substantially non-linear with the air inlet and with the duct being configured to conduct an airflow. The duct comprises a shaped input region located downstream of one or more air cleaning components and upstream of an impeller, a curved transition region downstream of the shaped input region, with the curved transition region transitioning the airflow from an air inlet orientation to an air outlet orientation, and an expansion output region downstream of the curved transition region, with the expansion output region allowing the airflow to expand. The air cleaner further comprises the impeller located in the curved transition region of the air duct. The airflow is smoothly conducted from the air inlet to the air outlet by the duct.

A method of forming an air cleaner including an improved airflow path is provided according to an embodiment of the invention. The method comprises providing a duct extending between an air inlet and an air outlet of the air cleaner and configured to conduct an airflow, providing a shaped input region in the duct and located downstream of one or more air cleaning components and upstream of an impeller, providing a curved transition region in the duct downstream of the shaped input region, with the curved transition region transitioning the airflow from an air inlet orientation to an air outlet orientation, and providing an expansion output region in the duct downstream of the curved transition region, with the expansion output region allowing the airflow to expand.

BRIEF DESCRIPTION OF THE DRAWINGS

The same reference number represents the same element on all drawings.

DETAILED DESCRIPTION OF THE INVENTION

Figure 1:
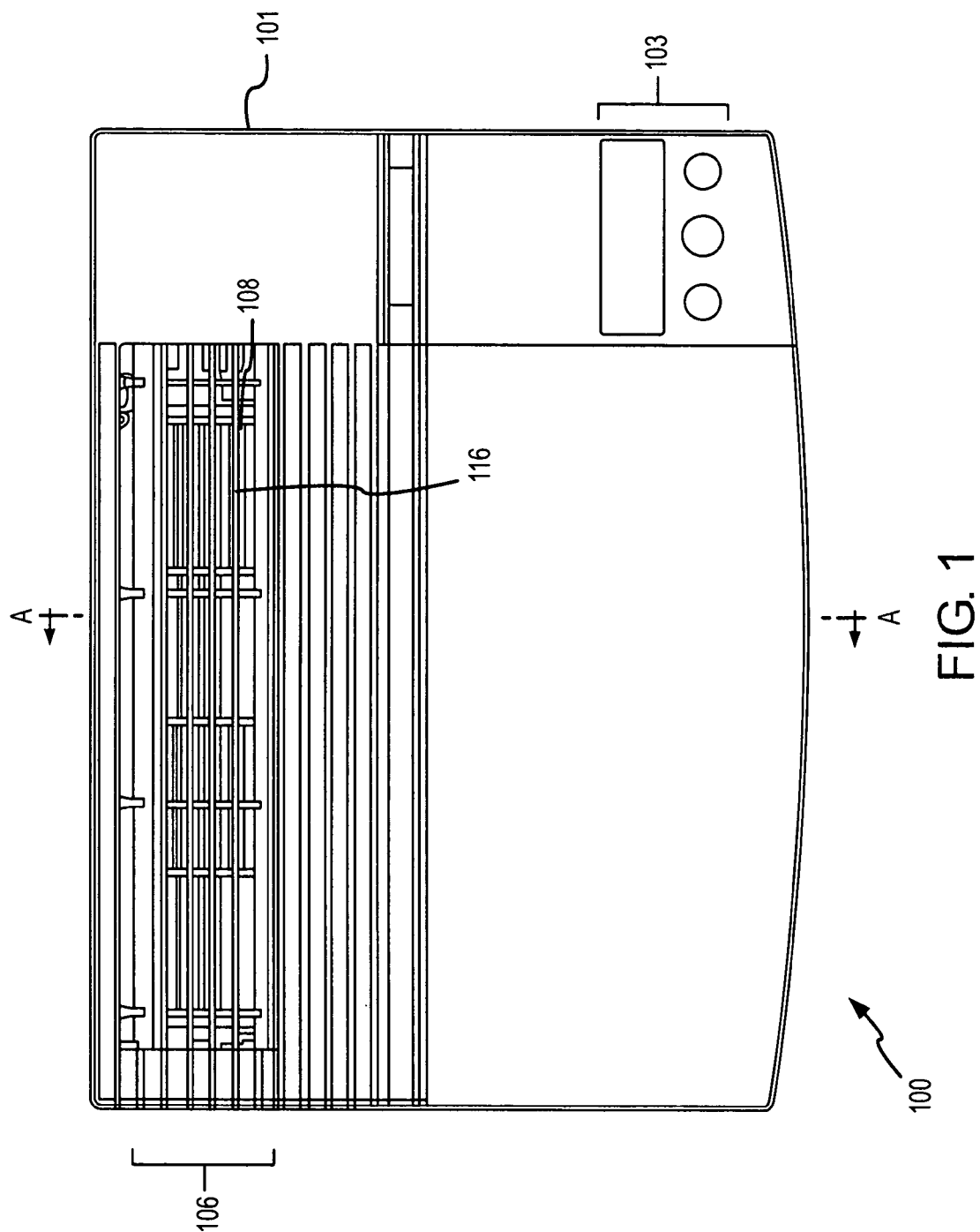
FIG. 1 is an overhead view of an air cleaner including an improved airflow path according to an embodiment of the invention.
Figure 2:
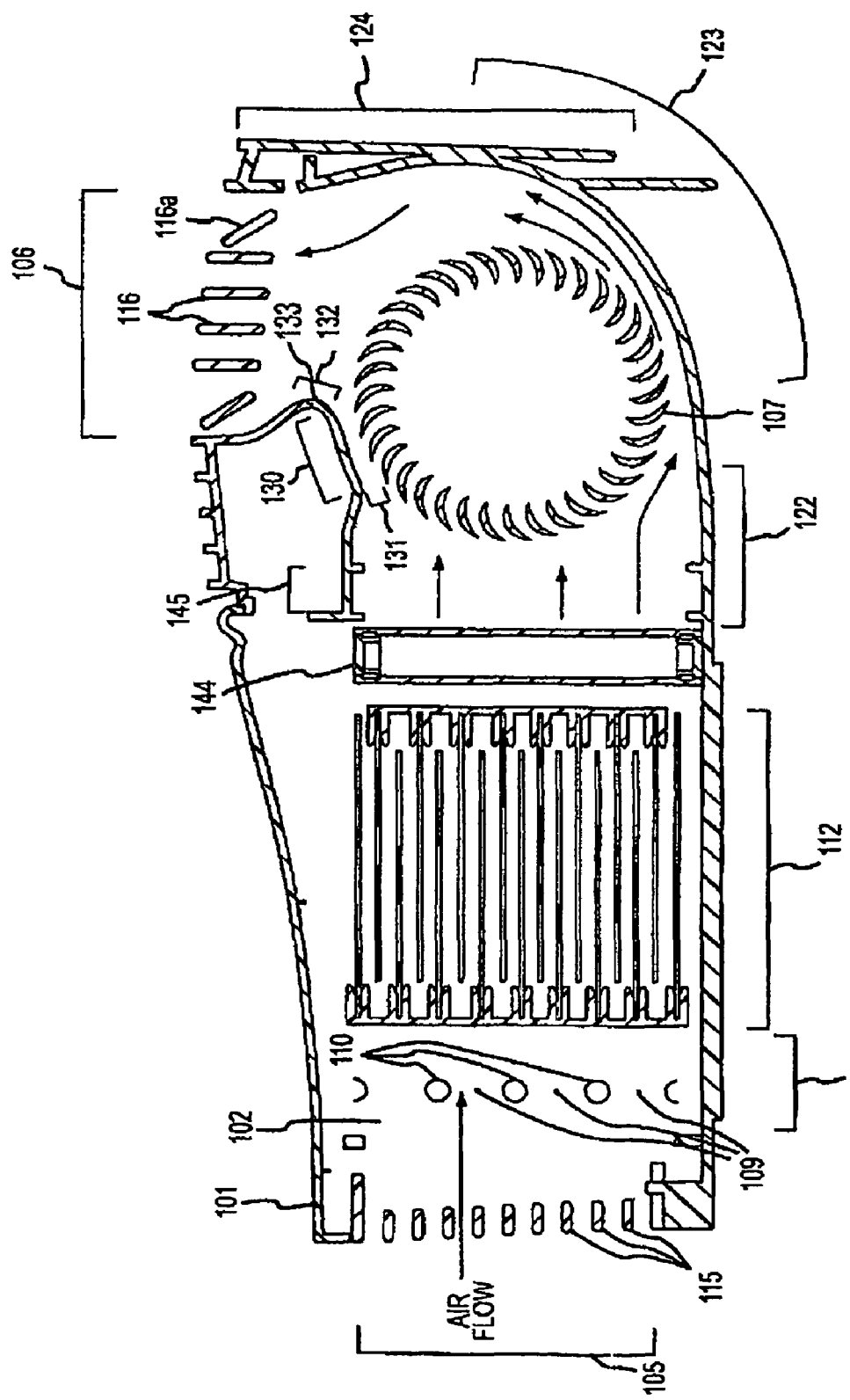
FIG. 2 is a section view AA of the air cleaner according to an embodiment of the invention.

FIGS. 1-2 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

FIG. 1 is an overhead view of an air cleaner 100 including an improved airflow path according to an embodiment of the invention. The air cleaner 100 includes a chassis 101, a control panel 103, an air outlet 106, and an impeller 107. Other components are shown in FIG. 2 and are discussed below. The impeller 107 is visible through the air outlet 106. The impeller 107 is rotated by a motor (not shown) in order to create airflow through the air cleaner 100. Airflow traveling through the air cleaner 100 is exhausted through the air outlet 106.

The air cleaner 100 can comprise a tabletop air cleaner in some embodiments. However, the air cleaner 100 can alternatively be a floor model, etc.

FIG. 2 is a section view AA of the air cleaner 100 according to an embodiment of the invention. This view further shows a duct 102 in the chassis 101. The duct 102 extends between an air inlet 105 and the air outlet 106. The air inlet 105 includes an inlet grill 115 and the air outlet 106 includes the outlet grill 116. The air cleaner 100 further includes a series of air cleaning components and an impeller 107.

In the embodiment shown, the air cleaning components include an ionizer 108 and a collector cell 112. The air cleaner 100 additionally includes a first frame 144 and a second frame 145. The first frame 144 and the second frame 145 can receive various filter elements, including an ozone filter element, an odor absorber element, or a mechanical filter element, for example. However, it should be understood that additional air cleaning components are contemplated and are within the scope of the description and claims. Airflow generated by the impeller 107 is drawn in through the air inlet 105, through the ionizer 108, through the collector cell 112, and through any air cleaner components in the first frame 144 and the second frame 145.

The impeller 107 in the embodiment shown comprises a cross-flow fan impeller that creates a substantially tangential airflow when rotated. Once the airflow enters the impeller 107, it is accelerated and exits at a downstream point, where it enters the volume bounded by the expansion output region 124.

The ionizer 108 comprises one or more corona charge elements 109 and corresponding corona ground elements 110. The corona charge elements 109 and the corona ground elements 110 create a high voltage electrical field that electrically charges (ionizes) the airflow and any passing dirt and debris. The charging of the particles can neutralize or kill living organisms. The ionized particles of the airflow are subsequently attracted to ground potential surfaces. Subsequently, the electrically charged dirt and debris is more likely to be pulled out of the airflow when the airflow passes through the collector cell 112, as described further below.

The collector cell 112 comprises interleaved charge and ground plates, wherein the airflow flows substantially in parallel through the plates. The charge plates are maintained at a high voltage. Dirt and debris in the airflow is electrostatically charged by the charge plates and the subsequently charged particles are attracted to and substantially retained on the ground plates. Dirt and debris in the airflow is therefore substantially removed.

Because the collector cell 112 is positioned in the airflow immediately after the ionizer 108, the ionization performed by the ionizer 108 improves removal performance of the collector cell 112. In addition, any charged particles not trapped or removed by the air cleaning components will be attracted to various surfaces around the home after exiting the air cleaner 100 and will subsequently be pulled out of the air.

The duct 102 is engineered to minimize turbulence and therefore maximize air cleaner efficiency. It should be noted that the duct 102 is smooth and is free of obstructions, sharp corners, etc. The air cleaner 100 provides substantially double the airflow as a comparable machine that employs a substantially linear, substantially rectangular ducting. As an additional benefit, the minimization of turbulence reduces noise and makes the air cleaner 100 less intrusive in an interior setting, such as in a home, office, etc.

The duct 102 includes a shaped input region 122. The shaped input region 122 is located downstream of the air cleaning components and upstream of the impeller 107. The airflow entering the shaped input region 122 is substantially linear. The airflow in one embodiment is substantially constrained in a linear manner by the parallel plate construction of the collector cell 112. As a result, the airflow travels through the shaped input region 122 and meets the impeller 107 in a substantially radial manner (see arrows). The shaped input region 122 in some embodiments is somewhat tapered and as a result the airflow will increase in velocity before the airflow meets the impeller 107.

The duct 102 further includes a curved transition region 123. The curved transition region 123 is downstream of the shaped input region 122. The impeller 107 resides in the curved transition region 123. The impeller 107 accelerates the air entering from the shaped input region 122. The curved transition region 123 transitions the airflow from an air inlet orientation to air outlet orientation.

In some embodiments, the air outlet 106 is non-linear with the air inlet 105. In some embodiments, the air outlet 106 is substantially angled with respect to the air inlet 105. In the embodiment shown, the air outlet 106 is substantially at a right angle to the air inlet 105 and therefore the airflow is transitioned substantially ninety degrees by the curved transition region 123.

The duct 102 further includes an expansion output region 124. The expansion output region 124 is downstream of the curved transition region 123 (although the two regions include some overlap). The curved transition region 123 can expand in cross-sectional area (and therefore in volume), while the expansion output region 124 can be at least partially curved. The expansion output region 124 in some embodiments comprises a partial spiral or scroll shape of expanding or increasing radius. The expansion output region 124 comprises a larger cross-sectional area adjacent to the impeller 107 that allows the airflow to expand and slow down. The expansion output region 124 directs the airflow so as to control the rate of expansion and minimize counter-flow and turbulence. As a consequence, noise generated by the air cleaner 100 is significantly reduced. For example, a reduced airspeed at the air outlet 106 reduces turbulence and noise at the outlet grill 116. Airflow leaving the impeller 107 travels through the expansion output region 124 to the outlet grill 116 and out of the air outlet 106.

The duct 102 further includes a cutoff region 130. The cutoff region 130 separates the shaped input region 122 from the expansion output region 124. The chassis 101 in the cutoff region 130 is formed adjacent to the impeller 107, separated by a predetermined cutoff gap 131. The cutoff gap 131 is relatively small. As a result, air pressure in the cutoff gap 131 is relatively high. The high pressure in the cutoff gap 131, in combination with a rounded nose 132 (see below), serves to separate the airflow from the impeller 107 and to force the airflow to remain in the expansion output region 124. However, the shape of the cutoff region 130 serves to minimize the high pressure and further spreads the change in pressure over a wider region using the rounded nose 132. The minimization of this high pressure region reduces fan cutoff noise at the cutoff region 130.

The cutoff region 130 in some embodiments includes a rounded nose 132 including a tip 133 that partially extends into the expansion output region 124. The rounded nose 132 aids in separating the airflow from the impeller 107 but without creating significant turbulence. The rounded aspect of the nose 132 serves to divide or deflect the airflow, much as in a conventional aircraft airfoil, wherein the airflow is moved aside in advance of the nose 132.

The inlet grill 115 and the outlet grill 116 both include grill members that allow the airflow to pass through but block any large objects from entering the duct 102. The grill members can comprise elongate strips including rounded or shaped leading and trailing edges. In one embodiment, a grill member can comprise a substantially airfoil-shaped member. The airflow passes over the grill members with minimal disturbance or turbulence.

In some embodiments, the outlet grill 116 includes one or more angled grill members 116a. The one or more angled grill members 116a can be disposed at a predetermined angle to the airflow at the air outlet 106. The one or more angled grill members 116a can be angled in order to shape and control the exiting airflow. The one or more angled grill members 116a can minimize divergence in the exiting airflow. This advantageously prevents the exiting airflow from re-entering the air outlet 106. The one or more predetermined grill members 116a can slow down the exiting airflow and cause it to swirl or rotate. A slower airspeed can reduce turbulence noise at the air outlet 106.

What is claimed is:

1. An air cleaner including an improved airflow path, comprising:
   a duct extending between an air inlet of the air cleaner and an air outlet, with the duct being configured to conduct an airflow and comprising:
      an input region located downstream of one or more air cleaning components and upstream of an impeller;
      a curved transition region downstream of the input region, with the curved transition region transitioning the airflow from an air inlet orientation to an air outlet orientation;
      an expansion output region downstream of the curved transition region, with the expansion output region allowing the airflow to expand;
   the impeller located in the curved transition region of the air duct wherein the airflow is smoothly conducted from the air inlet to the air outlet by the duct; and
   a rounded nose comprising a tip, wherein the tip partially extends into the expansion output region towards the air outlet.

2. The air cleaner of claim 1, with the air outlet being non-linear with the air inlet.

3. The air cleaner of claim 1, with the air outlet being substantially angled with respect to the air inlet.

4. The air cleaner of claim 1, with the air outlet being substantially at a right angle to the air inlet.

5. The air cleaner of claim 1, with the impeller comprising a cross-flow fan impeller disposed substantially lengthwise in the curved transition region.

6. The air cleaner of claim 1, further comprising a cutoff region between the input region and the expansion output region, with the cutoff region comprising a predetermined cutoff gap between the impeller and a chassis of the air cleaner and wherein the tip of the rounded nose is disposed downstream of the cutoff region.

7. The air cleaner of claim 1, further comprising an outlet grill substantially at the air outlet and including one or more angled grill members at a predetermined angle to the airflow at the air outlet.

8. An air cleaner including an improved airflow path, comprising:
   a duct extending between an air inlet of the air cleaner and an air outlet, with the air outlet being substantially non-linear with the air inlet and with the duct being configured to conduct an airflow and comprising:
      an input region located downstream of one or more air cleaning components and upstream of an impeller;
      a curved transition region downstream of the input region, with the curved transition region transitioning the airflow from an air inlet orientation to an air outlet orientation;
      an expansion output region downstream of the curved transition region, with the expansion output region allowing the airflow to expand;
   the impeller located in the curved transition region of the air duct, wherein the airflow is smoothly conducted from the air inlet to the air outlet by the duct;
   a cutoff region between the input region and the expansion output region;
   a cutoff gap disposed in the cutoff region for increasing a back pressure of airflow therein; and
   a rounded nose including a tip, wherein the tip partially extends into the expansion output region.

9. The air cleaner of claim 8, with the air outlet being substantially angled with respect to the air inlet.

10. The air cleaner of claim 8, with the air outlet being substantially at a right angle to the air inlet.

11. The air cleaner of claim 8, with the impeller comprising a cross-flow fan impeller disposed substantially lengthwise in the curved transition region.

12. The air cleaner of claim 8, further comprising an outlet grill substantially at the air outlet and including one or more angled grill members at a predetermined angle to the airflow at the air outlet.

13. A method of forming an air cleaner including an improved airflow path, the air cleaner comprising:
   providing a duct extending between an air inlet and an air outlet of the air cleaner and configures to conduct an airflow;
   providing an input region in the duct and located downstream of one or more air cleaning components and upstream of an impeller located in a curved transition region of the duct;
   providing the curved transition region in the duct downstream of the input region, with the curved transition region transitioning the airflow from an air inlet orientation to an air outlet orientation;
   providing an expansion output region in the duct downstream of the curved transition region, with the expansion out region allowing the airflow to expand; and
   reducing fan cutoff noise by providing a rounded nose including a tip that partially extends into the expansion output region towards the air outlet.

14. The method of claim 13, with the air outlet being non-linear with the air inlet.

15. The method of claim 13, with the air outlet being substantially angled with respect to the air inlet.

16. The method of claim 13, with the air outlet being substantially at a right angle to the air inlet.

17. The method of claim 13, further comprising providing the impeller in the curved transition region of the air duct, wherein the airflow is smoothly conducted from the air inlet to the air outlet by the duct.

18. The method of claim 13, further comprising providing the impeller in the curved transition region of the air duct, with the impeller comprising a cross-flow fan impeller disposed substantially lengthwise in the curved transition region and wherein the airflow is smoothly conducted from the air inlet to the air outlet by the duct.

19. The method of claim 13, further comprising providing a cutoff region between the input region and the expansion output region, with the cutoff region comprising a predetermined cutoff gap between the impeller and a chassis the expansion output region of the air cleaner.

20. The method of claim 13, further comprising providing a cutoff region between the input region and the expansion output region, with the cutoff region comprising a predetermined cutoff gap between the impeller and a chassis of the air cleaner and wherein the rounded nose is disposed downstream of the cutoff region.

21. The method of claim 13, further comprising providing an outlet grill substantially at the air outlet and including one or more angled grill members at a predetermined angle to the airflow at the air outlet.

22. The air cleaner of claim 1, with the expansion outlet region being a partial spiral or scroll shape with increasing radius.

23. The air cleaner of claim 1, wherein the rounded nose is disposed downstream of the impeller.

24. The air cleaner of claim 8, wherein the cutoff gap is small.

25. The air cleaner of claim 8, wherein the cutoff region is adjacent to the impeller.

26. An air cleaner including an improved airflow path, comprising:
- an impeller; and
- a duct to conduct an airflow extending between an air inlet of the air cleaner and an air outlet comprising:
- an input region located upstream of the impeller;
- a transition region downstream of the input region, with the transition region transitioning the airflow from an air inlet orientation to an air outlet orientation and with the transition region expanding in cross-sectional area from the air inlet to air outlet; and
- an expansion output region downstream of the impeller with a portion of the expansion output region having a partial spiral or scroll shape with increasing radius;

wherein the impeller is located in the transition region of the air duct wherein the airflow upstream of the impeller is tangential with respect to the airflow downstream of the impeller.

27. The air cleaner of claim 26 with the air outlet being substantially non-linear with the air inlet.

28. The air cleaner of claim 26 further comprising a rounded nose partially extending into the expansion output region.

29. The air cleaner of claim 26 with the duct having no sharp corners.

30. The air cleaner of claim 26 with the duct being free of obstructions.

31. The air cleaner of claim 26 with the expansion output region including a larger cross-sectional area adjacent to the impeller.

* * * * *

UNITED STATES PATENT AND TRADEMARK OFFICE
CERTIFICATE OF CORRECTION

| | | |
|---|---|---|
| PATENT NO. | : 7,857,884 B2 | Page 1 of 1 |
| APPLICATION NO. | : 11/479072 | |
| DATED | : December 28, 2010 | |
| INVENTOR(S) | : Bohlen | |

It is certified that error appears in the above-identified patent and that said Letters Patent is hereby corrected as shown below:

Column 5:
Line 17 (claim 1, line 16), before "duct" delete "air".

Signed and Sealed this
Fifteenth Day of February, 2011

David J. Kappos
*Director of the United States Patent and Trademark Office*